United States Patent

Ishihara et al.

[11] Patent Number: 5,953,439
[45] Date of Patent: *Sep. 14, 1999

[54] APPARATUS FOR AND METHOD OF EXTRACTING TIME SERIES IMAGE INFORMATION

[76] Inventors: Ken Ishihara, 1-15, Chigusa 1-chome, Takarazuka-shi, Hyogo; Masahiro Kawagoe, 2-4-202, Kamiichi 4-chome, Kashiwara-shi, Osaka; Ryozo Hasegawa, 4-26-105, Shimizu 3-chome, Suginami-ku, Tokyo, all of Japan

[*] Notice: This patent issued on a continued prosecution application filed under 37 CFR 1.53(d), and is subject to the twenty year patent term provisions of 35 U.S.C. 154(a)(2).

[21] Appl. No.: 08/921,795

[22] Filed: Sep. 2, 1997

Related U.S. Application Data

[63] Continuation of application No. 08/336,643, Nov. 4, 1994, abandoned.

[51] Int. Cl.[6] ........................................................ G06K 9/00
[52] U.S. Cl. ............................ 382/107; 382/207; 382/236
[58] Field of Search ................................... 382/103, 107, 382/130, 236, 154, 155, 169, 415, 416, 128, 207, 288, 282; 345/475; 128/721

[56] References Cited

U.S. PATENT DOCUMENTS 5,148,477  9/1992  Neely et al. ............................. 382/107
5,301,240  4/1994  Stockum et al. ........................ 382/100
5,500,904  3/1996  Markandey et al. .................... 382/103

*Primary Examiner*—Amelia Au
*Assistant Examiner*—Timothy M. Johnson
*Attorney, Agent, or Firm*—McDermott, Will & Emery

[57] ABSTRACT

An object of the present invention is to construct a sensing system capable of extracting change information as new time series information from a continuous moving picture in a non-contact manner and remotely without requiring a special illuminating and irradiating device and driving the succeeding processing system as required, to clearly show a phenomenon in an arbitrary frequency band existing in the moving picture. The present invention provides an apparatus for and a method of extracting time series image information, which comprises input means for inputting a moving picture of an object, primary processing means for detecting a primary information change in each of corresponding regions of a frame at a time point T0 which is updated and a frame at a time point T1 which is updated in a predetermined relationship with the time point T0 with respect to natural time series information on the moving picture inputted at a predetermined frame rate, secondary processing means for newly arranging the primary information change as an element to create a time-series-signalized primary information change which is arbitrary time series information and extracting a time-series-signalized secondary information change having a physical meaning different from that of the time-series-signalized primary information change as required.

10 Claims, 9 Drawing Sheets

304 TIME-SERIES-SIGNALIZED SECONDARY INFORMATION CHANGE EXTRACTION UNIT

504 SIMPLE INTENSITY SIGNAL OUTPUT UNIT

506 CONTROL SIGNAL INPUT-OUTPUT UNIT

APPARATUS FOR AND METHOD OF EXTRACTING TIME SERIES IMAGE INFORMATION

This application is a continuation of application Ser. No. 08/336,643 filed Nov. 4, 1994, now abandoned.

BACKGROUND OF THE INVENTION

1. Field of the Invention

The present invention relates to an apparatus for and a method of extracting a changed component on a moving picture as time series information, which corresponds to a significant improvement over conventional displacement sensors.

In various types of fields of industrial utility, the present invention makes it possible to measure slight displacement, analyze a linear motion, a rotary motion or a combination of the motions, analyze vibration, count frequencies, and recognize the state of an equipment, for example. On a production and/or processing line of predetermined products, the present invention makes it possible to detect defective products out of the products, and judge the tone of color and the sorting of the products. Even when living organisms are used as objects, it is possible to treat the growth of plants and the physiological phenomena and the actions of animals as time series signals. If the signals are utilized in the succeeding control system, it is feasible to control the position and the attitude, send alarms, start a transfer protocol of the signals or perform predetermined programmed work while holding feedback to the object.

So long as a moving picture is obtained as in cases such as a case where the operating states of domestic equipments, industrial equipments, constructional equipments and facilities on a production line of a factory are grasped and controlled, a case where the traffic conditions of an area are grasped and controlled, a case where the actions and the physiological states of human beings, animals and plants are grasped and a case where the dispensation of medicine, the supply of feed and the spraying of fertilizer are controlled, the present invention can be applied to the grasp of conditions and the prediction of abnormalities in various types of setting with respect to a desired phenomenon throughout all ranges of objects.

2. Description of the Prior Art

Examples of a displacement sensor for extracting a changed component of an object include a mechanical displacement sensor, an eddy current displacement sensor, a laser displacement sensor, and an ultrasonic displacement sensor. In the field of measurements of displacement using input of a video camera, there is a method which is referred to as computer vision. Conventional techniques will be described with respect to the displacement sensors.

The mechanical displacement sensor is a sensor whose part is brought into contact with an object to directly measure displacement. One example is a differential transformer. The differential transformer comprises three coils. A core connected to a metal portion in direct contact with the object is linearly moved in the coils. An AC current is caused to flow in the central coil, and signals are differentially taken out of the right and left coils by applying the principle of electromagnetic induction, to detect the position of the core.

In the eddy current displacement sensor, an AC voltage is previously applied to a coil wound around an insulator. If an object to be measured which is composed of a conductor is brought near the eddy current displacement sensor, an eddy current is produced in the conductor by an AC magnetic field formed by the coil. The eddy current varies depending on the distance from the displacement sensor to the object. The displacement sensor detects the position and the displacement of the object by measuring the change in a voltage excited in the coil.

The laser displacement sensor is a sensor for measuring the displacement of an object utilizing interference of laser light. The principle is essentially the same as that of a Michelson interferometer. Specifically, laser light is divided into reflected light and transmitted light by a semi-transparent mirror. The reflected light is reflected by a fixed reflector and then, converges on a photodetector, while the transmitted light is reflected by a moving reflector and then, converges on the photodetector. Since two beams of light are incident on the photodetector, interference fringes are formed on the surface of the photodetector. The number of interference fringes crossing one point on the surface of the photodetector is counted, thereby to make it possible to measure the distance at which the moving reflector is moved.

The ultrasonic displacement sensor detects the position and the displacement of an object utilizing the time when ultrasonic waves propagate in a medium such as a gas, a liquid, a solid or a living organism, the Doppler effect and interference.

Furthermore, a technique referred to as computer vision is known as a technique for treating an image inputted by a CCD (Charge Coupled Device) sensor or the like and extracting space information so as to measure the motion and the shape of a moving object utilizing an image processing technique. This is used for observing the motion and the shape of the moving object in the steps of extracting particular points related to the shape of the moving object from one or a plurality of images at the same time by a complicated algorithm for mathematically solving various types of simultaneous equations and establishing a correspondence between their values and an actual three-dimensional space to reconstruct information on the three-dimensional space.

Contrary to the conventional techniques, a technique for extracting a changed component of a living organism and displaying the same by using as image processing difference extraction of video images whose operation can be performed at high speed has been studied.

This technique is described in Proceedings of 12-th Joint Conference on Medical Informatics (issued on November, 1992), pp. 77–78 and Proceedings of 32nd Conference on Japan Society of Medical Electronics and Biological Engineering (issued on May 1, 1993), pp. 218, for example.

In this technique, a continuous video moving picture including an object is continuously subtracted for each time difference to cancel information on an unchanged portion of the object and continuously extract and display only a changed component of the object.

Although the foregoing sensors are examples of the displacement sensor for extracting a changed component of an object, they have the following disadvantages.

Since the mechanical displacement sensor must be brought into direct contact with the object, although it is utilized in a displacement detector or the like in various types of plants, it cannot make measurements in a system whose direct contact with the object should be avoided.

Although the eddy current displacement sensor is utilized in detection of the level displacement of molten steel in molds in steel industry, for example, the relationship between the distance to the object and an output voltage must be previously examined in making measurements to adjust a zero span because an output value differs depending on the material of the object, and the object is limited to one causing an eddy current.

Although the laser displacement sensor is widely utilized for measurements of displacement, flow rates, distances, shapes and the like utilizing its high coherence, it requires a laser irradiating device which is a special light source high in cost and requiring care in treatment.

Although the ultrasonic displacement sensor has superior advantages that it is applied to various types of sensors developed utilizing the property of ultrasonic waves propagating in almost all media and particularly it can nonconstructively measure the internal state of a material, it has some disadvantages. For example, it requires an irradiating device, similarly to the laser displacement sensor, and it may not, in some cases, easily identify a portion to be measured because it cannot accurately recognize a space.

Although the computer vision is apparently similar to the present invention in that it can treat a moving picture, it basically forces particular points extracted from one or a plurality of images at the same time, that is, so-called stereoscopic vision or the like to be reconstructed (or restored) to three-dimensional space information. Accordingly, an algorithm or a circuit for finding an optimal solution become very complicated. In many cases, it is impossible not only to perform high-speed processing but also cause the optimal solution to diverge and obtain the practical precision because the computer vision has bad resistance to noises. Although the computer vision treats one or a plurality of images, it does not arrange in time series particular points, which are displayed on a CRT, for example, for each measurement, extracted from the images and treat the particular points as a time series signal.

Although the technique in the above described two articles, that is, Proceedings of 12th Joint Conference on Medical Informatics and Proceedings of 32nd Conference on Japan Society of Medical Electronics and Biological Engineering is a method of detecting a changed component of an object with high precision, the function is only output of a differential image and a measured value at a certain time point to a CRT or the like. For example, if the technique is applied to the diagnosis of abnormalities of a plant, an operator must always watch a CRT screen, which is not practical in terms of labor saving. Since the differential image is a differential image as a continuous moving picture but is not a time series signal as numeral data, the differential image cannot be treated as a time series signal by sampling using an ordinary analog-to-digital (A/D) converter. Since the hysteresis of various past data is not stored, difference between past hysteresis and present hysteresis are not recognized. Consequently, information is insufficient to apply the technique to the improvement in the precision of the diagnosis of abnormalities and the detection of abnormalities.

SUMMARY OF THE INVENTION

A fundamental object of the present invention is to provide a sensing system capable of extracting change information as new time series information from a continuous moving picture in a non-contact manner and remotely without requiring a special illuminating and irradiating device such as a conventional laser displacement sensor or ultrasonic displacement sensor and driving the succeeding processing system as required. The sensing system not only continuously outputs differential images or the like on a screen but also converts information on various types of changes in a time domain extracted by an operation between images into a time series signal to clearly show a phenomenon in an arbitrary frequency band existing in the moving picture, and further extracts a predetermined characteristic parameter from the time series signal as required to represent the nature of the phenomenon and automatically start the succeeding processing and judgment system.

In many cases, the moving picture has been conventionally grasped as a huge mass of continuous information. It is considered that time series changes of a phenomenon such as movement, rotation, appearance or disappearance, and change in tone of color on the moving picture are recognized as clearly distinguished from a normal time series signal which can be sampled by an ordinary A/D converter because they are distributed on a predetermined area.

The present invention makes it possible to take the time series changes of a phenomenon, which are distributed on a predetermined area, such as movement, rotation, appearance or disappearance and change in tone of color on a moving picture as elements of a value of an information change which is extracted as a surface integral from the amount of change in each pixel in a time cross section at predetermined time intervals and further rearrange a collection of the elements in a time domain to convert the collection into the form of a normal time series signal, which can be sampled as time series information by an ordinary A/D converter.

In actual fields of application, the present invention makes it possible to measure slight displacement, analyze a linear motion, a rotary motion or a combination of the motions, analyze vibration, count frequencies, and recognize the state of an equipment, for example. On a production line of predetermined products, the present invention makes it possible to detect defective products out of the products, and judge the tone of color and the sorting of the products. Even when living organisms are used as objects, it is possible to treat the growth of plants and the physiological phenomena and the actions of animals as time series signals. If the signals are utilized in the succeeding control system, it is feasible to control the position and the attitude, send alarms, start a transfer protocol of the signals or perform predetermined programmed work while holding feedback to the object.

So long as a moving picture is obtained as in cases such as a case where the operating states of domestic equipments, industrial equipments, constructional equipments and facilities on a production line of a factory are grasped and controlled, a case where the traffic conditions of an area are grasped and controlled, a case where the actions and the physiological states of human beings, animals and plants are grasped and a case where the dispensation of medicine, the supply of feed and the spraying of fertilizer are controlled, the present invention can be applied to the grasp of conditions and the prediction of abnormalities in various types of setting with respect to a desired phenomenon throughout all ranges of objects.

The present invention is directed to newly processing and extracting arbitrary time series information from natural time series information in a moving picture recorded using the existing moving picture photographing means, using a changed component extracting method and sampling intervals which are inevitably determined by the frequency band, the displacement speed, the frequency of occurrence or the like which a phenomenon to be measured requires.

In order to attain the above described object, an apparatus for extracting time series image information according to the present invention is characterized by comprising input means for inputting a moving picture of an object, primary processing means for detecting a primary information change in each of corresponding regions of a frame or field at time point T0 which is updated and a frame at a time point T1 which is updated in a predetermined relationship with the time point T0 with respect to natural time series information on the moving picture inputted at a predetermined frame rate, secondary processing means for newly arranging the primary information change as an element to create a time-series-signalized primary information change which is arbitrary time series information and extracting a time-series-signalized secondary information change having a physical meaning different from that of the time-series-signalized primary information change as required, and higher-order processing means for extracting a higher-order characteristic parameter as required, output means for outputting the information after the processing and/or the characteristic parameter, and internal control means for controlling the information after the processing and/or the characteristic parameter.

The apparatus for extracting time series image information according to the present invention has the input means for inputting a moving picture of an object. With respect to unprocessed, that is, natural time series information existing in the moving picture inputted at a predetermined frame rate by the input means, a changed component for each pixel is detected by the primary processing means as described below, and a changed component image as a collection of changed components is extracted. With respect to a predetermined region of interest (ROI) of the inputted moving picture, the moving picture is updated, or the changed component image in each of corresponding regions of the frame at the time point T0 which is updated in accordance with a predetermined program and the frame at the time point T1 which is updated in a predetermined relationship with the time point T0 is created by the subtraction or the division of images, or the extraction of change for each pixel using a predetermined look-up table.

Although the time point T0 is desirably a time point where the newest image is inputted in the ordinary case, it may, in some cases, be a predetermined past time point already recorded depending on necessary information. The time point T1 is a time point where a predetermined interval determined from a changed component extracting method inevitably determined by the frequency band, the displacement speed, the frequency of occurrence or the like which a phenomenon to be measured requires is held with respect to the time point T0.

The changed component image is a two-dimensional image represented by extracting a changed component for corresponding pixels between images at a plurality of different time points of a continuous moving picture using a predetermined operation between images, giving a predetermined value when the changed component is not more than a predetermined threshold value, while giving a value corresponding to the changed component when the changed component exceeds a predetermined threshold value.

The primary information change is an amount obtained by adding a changed component for each pixel which is an element of a changed component image. Consequently, the primary information change becomes one scalar value if the inputted original moving picture is a black and white shaded two-dimensional image, so that the dimension is decreased, which is favorable in performing the succeeding processing. The foregoing are performed by the primary processing means.

The primary information change is newly arranged as an element, thereby to create a time-series-signalized primary information change which is arbitrary time series information in the secondary processing means. A time-series-signalized secondary information change having a physical meaning different from that of the time-series-signalized primary information change is extracted as required in the secondary processing means.

As an example, if the time-series-signalized primary information change is a time series signal representing the speed of the motion or the change of an object to be measured, the time-series-signalized secondary information change becomes a time series signal having a physical meaning which differ in the acceleration by differentiation or differ in the position or the distance by integration.

A higher-order characteristic parameter representing the nature of the time-series-signalized primary information change and/or the time-series-signalized secondary information change as a time series signal is extracted by the higher-order processing means as required. As an example, if the time-series-signalized secondary information change is the position, it is subjected to frequency analysis such as high-speed Fourier transformation, thereby to obtain frequency characteristics.

Furthermore, the above described object is attained by further comprising the means for outputting the information after the processing and/or the characteristic parameter and the internal control means for controlling the information and/or the characteristic parameter.

It is desirable as an efficient apparatus for extracting time series image information that with respect to the change and/or the motion of an object having frequency characteristics in a predetermined frequency band, the predetermined frame rate of the input means is two to ten times the frequency of the object.

A method of previously storing image information to be a basis irrespective of the predetermined frame rate of the input means with respect to the change and/or the motion of an object having no frequency characteristics or having obscure frequency characteristics and comparing an inputted image with the image information at the predetermined time when it is desired to detect the presence or absence of the change is also one of preferred methods of using the apparatus for extracting time series image information.

Furthermore, the above described object is attained by using, in the input means, at least one means and/or medium in a group consisting of video camera means, photographing means used in place of an imaging device utilizing photo-sensitivity of a video endoscope or a RAM (Random Access Memory) chip, silver salt photographing means, a thermography, ultrasonic tomographying means, MRI (Magnetic Resonance Imaging), X-ray CT (Computer Tomography), a scintigraphy and a digital radiography irrespective of photographing at a speed normally used, high-speed photographing and low-speed photographing.

Additionally, the present invention may use, as the moving picture, a moving picture from primary and secondary position sensing detectors, a photosensor for sensing simple reflection of a pin point or an area, or an electromagnetic sensor.

In order to attain the above described object more advantageously, in the apparatus for extracting time series image information according to the present invention, the input means comprises means for selecting one or a plurality of arbitrary spatial and/or time regions of interest as required.

In order to attain the above described object more easily, in the apparatus for extracting time series image information according to the present invention, the input means comprises means for moving the position for photographing to trace the object so that the whole thereof does not depart from a frame.

In order to attain the above described object more easily, in the apparatus for extracting time series image information according to the present invention, the input means comprises means for correcting the movement of the whole of the object in a frame when the change of a part of the object is detected.

Furthermore, in the apparatus for extracting time series image information according to the present invention, it is desirable that the above described object can be attained more easily by comprising, in the input image, the primary processing means, the secondary processing means and/or the higher-order processing means, at least one of interpolating means, smoothing means, under-threshold noise reducing means, bias adjusting means, discrete cosine transforming means (so-called DCT means in an image compressing technique), and frequency analyzing means and error signal correcting means.

Furthermore, in the apparatus according to the present invention, it is desirable that the above described object can be attained more easily by comprising, in at least one of the input means, the primary processing means, the secondary processing means, the higher-order processing means, the output means and/or the control means, means for storing required one or ones of image information, input information, a changed component, a changed component image, a primary information change, a time-series-signalized primary information change, a time-series signalized secondary information change, a higher-order characteristic parameter, processing information related to the foregoing, output information and control information.

In order to attain the above described object more easily, in the apparatus for extracting time series image information according to the present invention, the primary processing means has a function of extracting a changed component image from corresponding images in the same portion of the frame at the time point T0 and the frame at the time point T1 which is updated in a predetermined relationship with the time point T0 by performing subtraction processing or division processing and/or referring to a look-up table prepared depending on the objective of information extraction and extracting from the changed component image the primary information change such as the surface integral of the changed component or the spatial center of gravity.

In order to attain the above described object more easily, in the apparatus for extracting time series image information according to the present invention, the secondary processing means has a function of comparing the primary information change obtained in the primary processing means with a predetermined threshold value to perform labeling and predetermined arrangement every time the primary information change exceeds the threshold value, employing the primary information change as data arranged in time series, performing threshold processing, smoothing processing, interpolation processing and improvement in a signal-to noise (S/N) ratio of a signal using a median filter, followed by at least one of differentiation and integration processing, subtraction processing, division processing, Schmitt trigger processing and averaging processing as required, to extract a time-series-signalized secondary information change having a physical meaning different from that of the time-series-signalized primary information change.

Furthermore, in the apparatus according to the present invention, it is preferable that the above described object is attained by comprising, in the higher-order processing means, a function of performing at least one processing in a group consisting of time series signal processing, high-speed Fourier transformation, an auto-correlation function, a cross-correlation function, discrete cosine transformation, a zero crossing method, a maximum entropy method, frequency analysis, phase shift detection, differentiation and integration, a moment and a cepstrum.

Furthermore, in the apparatus according to the present invention, it is preferable that the above described object is attained by comprising, in the output means, a function of using at least one of a video signal, a simple intensity signal, a frequency modulation signal, a serial digital signal, a digital bus signal and a pulse modulation signal.

In order to attain the above described object more easily, in the apparatus for extracting time series image information according to the present invention, the internal control means has a function which can be synchronized with at least one of warning means, event trigger and external control means by an input-output signal.

Furthermore, in the apparatus according to the present invention, it is desirable that the above described object is attained more easily by comprising, in the output means, a function corresponding to at least one communication system and/or automatic communication control system in a group consisting of a measuring instrument, a communication protocol among computers, a public telephone line, an INS (Information Network System) line, an ISDN (Integrated Services Digital Network) line, an FDDI line, Ethernet, GPIB (General Purpose Interface Bus), RS232C, RS422A, an optical cable network, a wire cable network, a data bus and an address bus.

In order to attain the above described object, a method of extracting time series image information according to the present invention is characterized by comprising the steps of inputting a moving picture of an object, performing primary processing for detecting a primary information change in each of corresponding regions of a frame at a time point T0 which is updated and a frame at a time point T1 which is updated in a predetermined relationship with the time point T0 with respect to natural time series information on the moving picture at a predetermined frame rate, performing secondary processing for newly arranging the primary information change as an element to create a time-series-signalized primary information change which is arbitrary time series information and extracting a time-series-signalized secondary information change having a physical meaning different from that of the time-series-signalized primary information change as required, performing higher-order processing for extracting a higher-order characteristic parameter as required, and outputting the information after the processing and/or the characteristic parameter.

In the method according to the present invention, it is preferable that the above described object is attained more easily by using, in the inputting step, at least one step and/or medium in a group consisting of the step of photographing using a video camera, the step of photographing utilizing the photosensitivity of a video endoscope or a RAM chip, the silver salt photographing step, a thermography, the ultrasonic tomographying step, MRI, X-ray CT, a scintigraphy and a digital radiography.

In order to attain the above described object more easily, in the method of extracting time series image information according to the present invention, the step of performing secondary processing comprises the steps of comparing the primary information change obtained in the step of performing primary processing with a predetermined threshold value to perform labeling and predetermined arrangement every time the primary information change exceeds the threshold value, employing the primary information change as data arranged in time series, performing threshold processing, smoothing processing, interpolation processing and improvement in a signal-to-noise (S/N) ratio of a signal using a median filter, followed by at least one of differentiation and integration processing, subtraction processing, division processing, Schmidt trigger processing and averaging processing as required, to extract a time-series-signalized secondary information change having a physical meaning different from that of the primary information change.

The primary processing means, the secondary processing means and the higher-order processing means in the apparatus according to the present invention specifically mean functions included in computer means such as a CPU (Central Processing Unit).

The input means in the apparatus according to the present invention has a function of following an object and a function of correcting the position of an object, thereby to make it possible to always extract necessary information. Since the input means selects one or a plurality of regions of interest, the physical amount of data is decreased, thereby to make it possible to realize the decrease in redundancy, the measurement in real time, and the ease of transfer on communication without losing utility as information.

In the primary processing means, high-speed processing of an operation between images and versatile processing can be realized by referring to a look-up table prepared depending on the objective of information extraction (subtraction, division, differentiation and integration, binary-coding or gamma correction). The extracted changed component image and the primary information change such as the spatial center of gravity representing the surface integral of the changed component and the movement characteristics of the object which is extracted from the changed component image are continuously outputted to a CRT screen, for example, which is effectively utilized as means for visually reporting abnormal conditions of the object to an operator in a factory.

In the secondary processing means, extraction processing of the time-series-signalized secondary information change having a physical meaning different from that of the primary information change is performed by time series processing of the primary information change extracted by the primary processing means, and differentiation and integration processing, subtraction processing, Schmitt trigger processing or averaging processing. The time-series-signalized secondary information change is also displayed on the CRT screen, for example, similarly to the changed component image and the time-series-signalized primary information change after the improvement in noises, which is effectively utilized for not only the diagnosis of abnormalities of the object but also the prediction of abnormalities.

The major feature of the present invention which is different from the conventional techniques is that an information change serving as numerical information which is not secondary image information obtained as a result of executing an operation between images in a continuous moving picture is converted into a time series signal. The information change is converted into the time series signal, thereby to recognize changes with time in various types of information changes and characteristic parameters and consequently, realize the detection of abnormalities of equipments or plants.

In the external control means, another measuring instrument or computer can be controlled, thereby to make it possible to remotely monitor the change in necessary information of an object in a remote location using communication means. Consequently, the most suitable correspondence corresponding to the information change is realized by an operator.

In the apparatus for extracting time series image information according to the present invention, the means or steps may be separately provided or integrated. In addition, the primary processing means, the higher-order processing means and the internal control means may be integrated, and the input means and the output means may be separately provided.

As the apparatus according to the present invention, components or circuits constituting the primary processing means, the higher-order processing means and the internal control means can be located on one board, to construct a so-called one board apparatus. Further, the input means and the output means may be also carried on a processing means board, to construct a one board apparatus.

Additionally, as the apparatus according to the present invention, components or circuits constituting the primary processing means, the higher-order processing means and the internal control means can be constituted by one integrated circuit, to construct a so-called one-chip apparatus. Further, a part or all of the input means and the output means may be constructed on one chip on which the processing means are constructed. This mode can be used as a one-chip sensor.

The effect of the present invention is to construct a sensing system capable of extracting change information as new time series information from a continuous moving picture in a non-contact manner and remotely without requiring a special illuminating and irradiating device such as a conventional laser displacement sensor or an ultrasonic displacement sensor and driving the succeeding processing system as required. The sensing system not only continuously outputs difference images and the like on a screen but also converts information on various types of changes in a time domain extracted by an operation between images into a predetermined time series signal to clearly show a phenomenon in an arbitrary frequency band existing in the moving picture, and further extracts a predetermined characteristic parameter from the time series signal as required to represent the nature of the phenomenon and automatically start the succeeding processing and judgment system.

In many cases, the moving picture has been conventionally grasped as a huge mass of continuous information. It is considered that time series changes of a phenomenon such as movement, rotation, appearance or disappearance, and change in tone of color on the moving picture are recognized as clearly distinguished from a normal time series signal which can be sampled by an A/D converter because they are distributed on a predetermined area. The present invention is characterized by taking the time series changes of a phenomenon, which are distributed on a predetermined area, such as movement, rotation, appearance or disappearance and change in tone of color on a moving picture as elements of a value of an information change which is extracted as a surface integral from the amount of change in each pixel in a time cross section at predetermined time intervals of a time space and further rearranging a collection of the elements in a time domain to convert the collection into the form of a normal time series signal which can be sampled as time series information by the A/D converter.

In various types of fields of application, the present invention makes it possible to measure slight displacement, analyze a linear motion, a rotary motion or a combination of the motions, analyze vibration, count frequencies, and recognize the state of an equipment, for example. On a production line of predetermined products, the present invention makes it possible to detect defective products out of the products, and judge the tone of color and the sorting of the products. Even when living organisms are used as objects, it is possible to treat the growth of plants and the physiological phenomena and the actions of animals as time series signals. If the signals are utilized in the succeeding control system, it is feasible to control the position and the attitude, send alarms, start a transfer protocol of the signals or perform predetermined programmed work while holding feedback to the object.

So long as a moving picture is obtained as in cases such as a case where the operating states of domestic equipments, industrial equipments, constructional equipments and facilities on a production line of a factory are grasped and controlled, a case where the traffic conditions of an area are grasped and controlled, a case where the actions and the physiological states of human beings, animals and plants are grasped and a case where the dispensation of medicine, the supply of feed and the spraying of fertilizer are controlled, the present invention can be applied to the grasp of conditions and the prediction of abnormalities in various types of setting with respect to a desired phenomenon throughout all ranges of objects.

Furthermore, the present invention is also effective for early discovery of accidents in pools, sky grounds, parks and the like, and automatic sending of alarms, for example.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
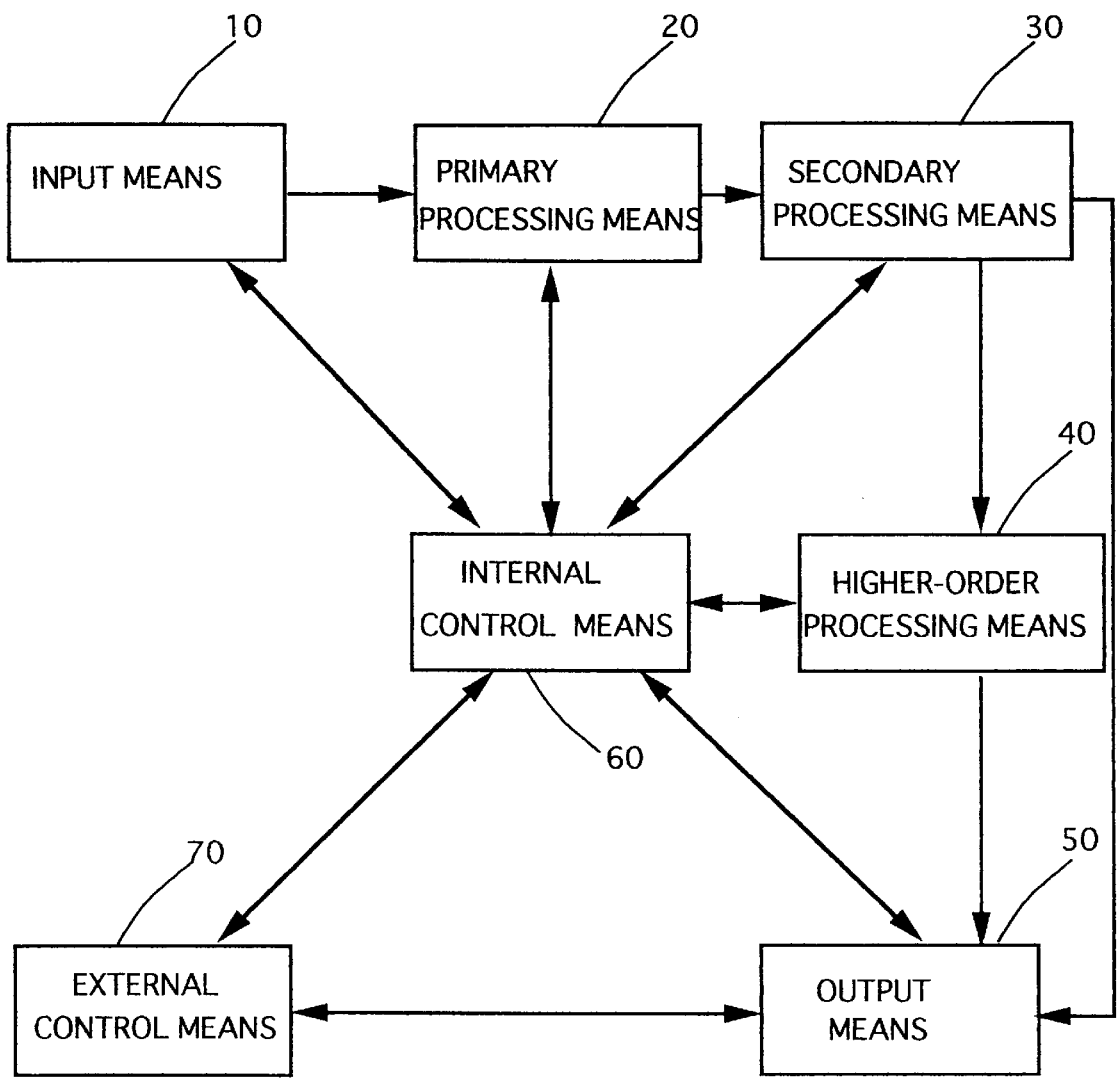
FIG. 1 is a block diagram showing the entire construction of a preferred embodiment of an apparatus for extracting time series image information according to the present invention.

A preferred embodiment of the present invention will be described in detail with reference to the drawings. FIG. 1 is a block diagram showing the entire construction of an apparatus for extracting time series image information according to the present invention. As shown in FIG. 1, the apparatus for extracting time series image information comprises input means 10, primary processing means 20, secondary processing means 30, higher-order processing means 40, output means 50, external control means 70, and internal control means 60.

Figure 2:
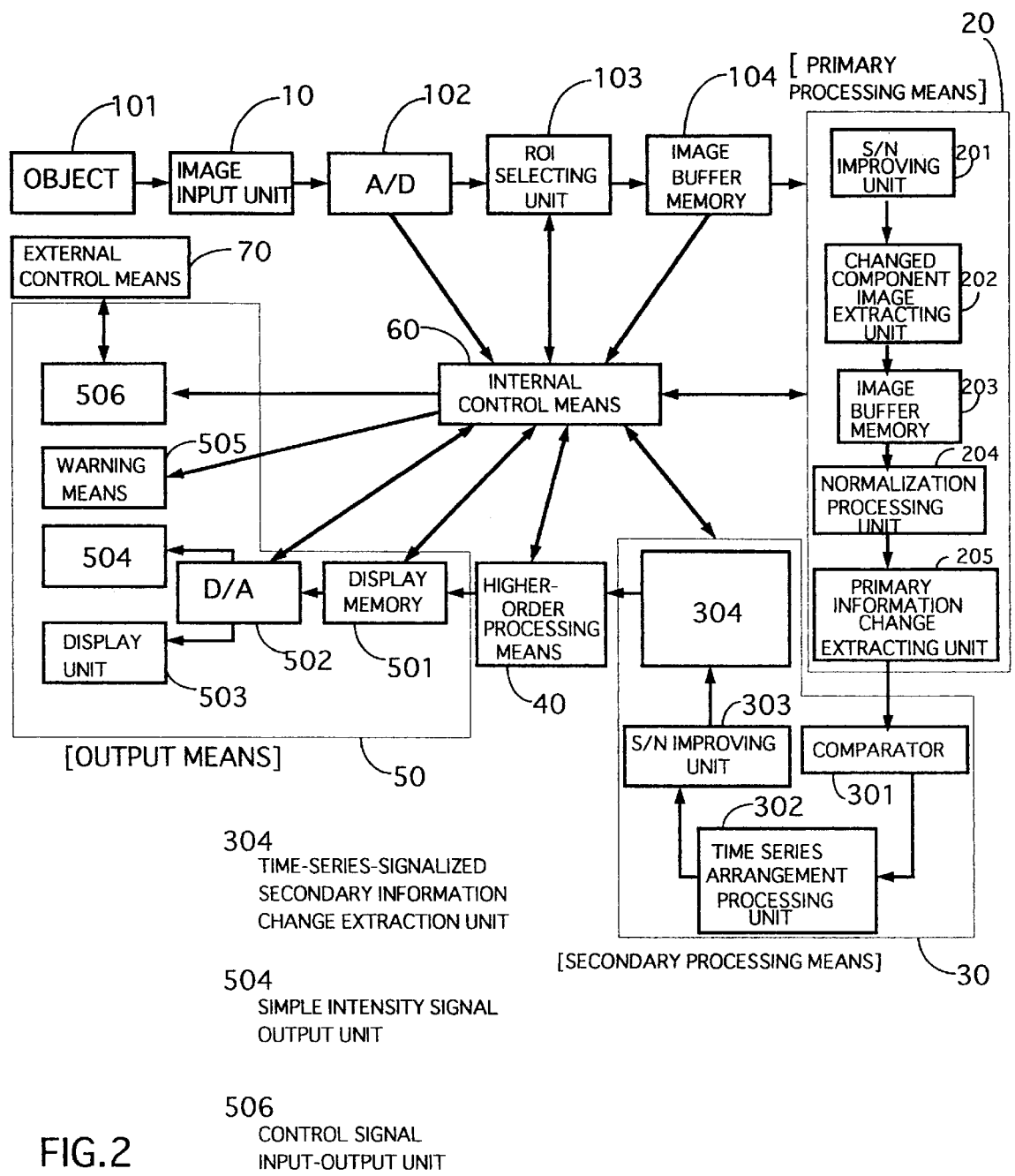
FIG. 2 is a block diagram showing in detail the preferred embodiment of the apparatus according to the present invention.

FIG. 2 is a diagram showing the details of FIG. 1. In FIG. 2, reference numeral 101 denotes an object to be measured, and reference numeral 10 denotes an image input unit of the object 101, which is composed of a CCD imaging device, for example. Reference numeral 102 denotes an A/D converter, which converts a moving picture inputted from the image input unit 10 into a digital signal for each pixel.

Figure 3:
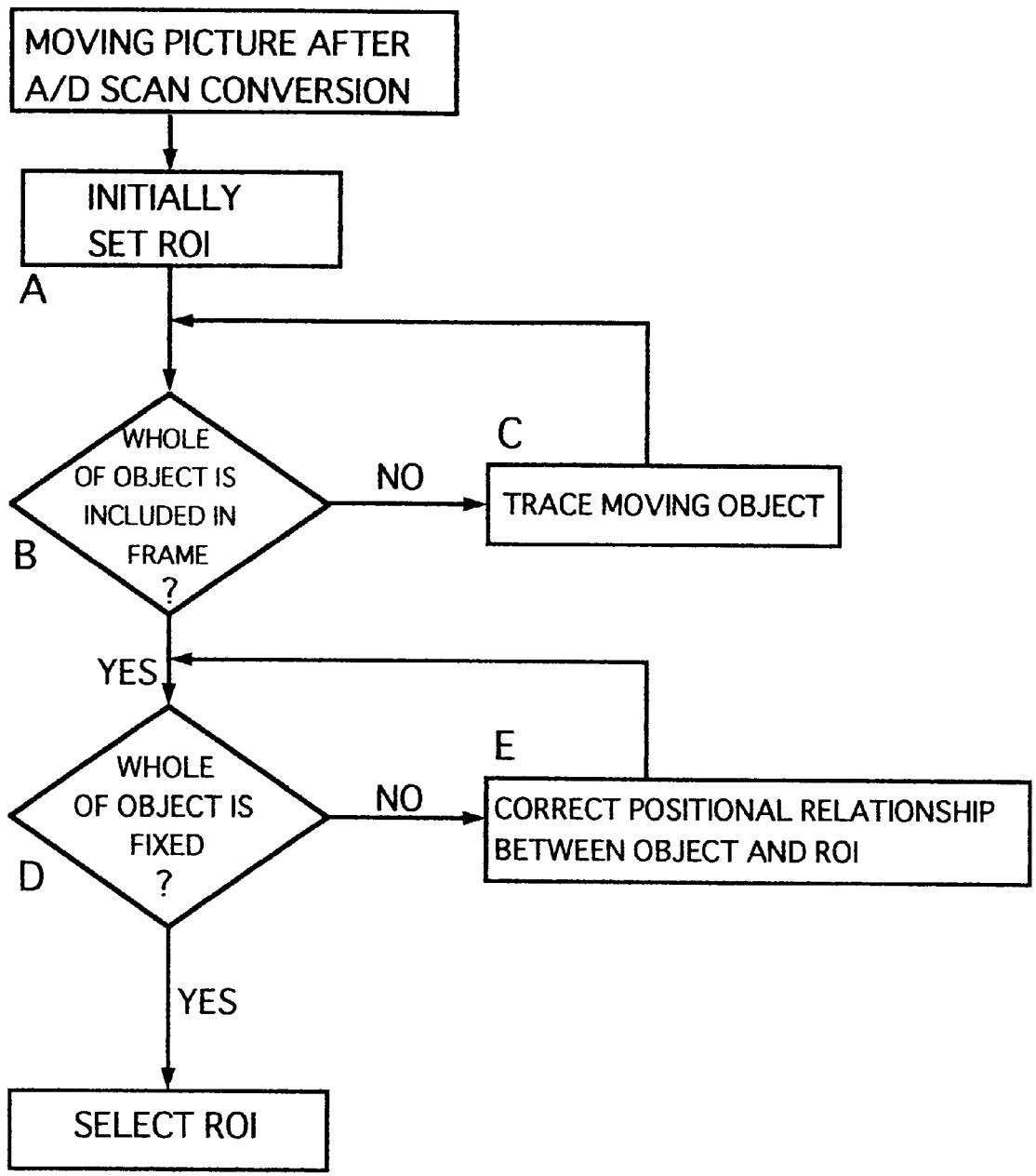
FIG. 3 is a flow chart showing the step of selecting regions of interest in a method of extracting time series image information according to the present invention.

Reference numeral 103 denotes an ROI selecting unit. Description is made of a series of operations of the ROI selecting unit 103 with reference to a flow chart of FIG. 3. One or a plurality of regions of interest on a frame including an object converted into a digital signal by the A/D converter (i.e. digital scan converter) 102 are first initially selected (step A). Every time a moving picture is inputted, it is judged by pattern matching processing or comparison processing of an amount of the changed component with a threshold value whether or not the whole of the object in the region of interest initially selected is included in a frame updated (step B). When even a part of the object is not included in the frame, the CCD imaging device traces the object by the movement so that the whole of the object included in the original region of interest is included in a frame within its field of view, and is so set again that the object coincides with the region of interest.

If the whole of the object is included in the frame or after the CCD imaging device is so operated that the whole of the object is included in the frame in the step C, it is judged by pattern matching processing or comparison processing of the amount of a changed component with a threshold value, as in the step B, whether or not the whole of the object is not moved from the region of interest (step D). If the object is moved, the positional relationship between the object and the region of interest is corrected by moving the object on the frame and/or resetting the region of interest so that the object and the region of interest coincide with each other (step E). Consequently, the selection of a new region of interest is completed, thereby to make it possible to continuously observe the object included in the region of interest initially set.

Reference numeral 104 denotes an image buffer memory for temporarily storing a plurality of images each representing a region of interest which are selected by the ROI selecting unit 103.

Figure 4:
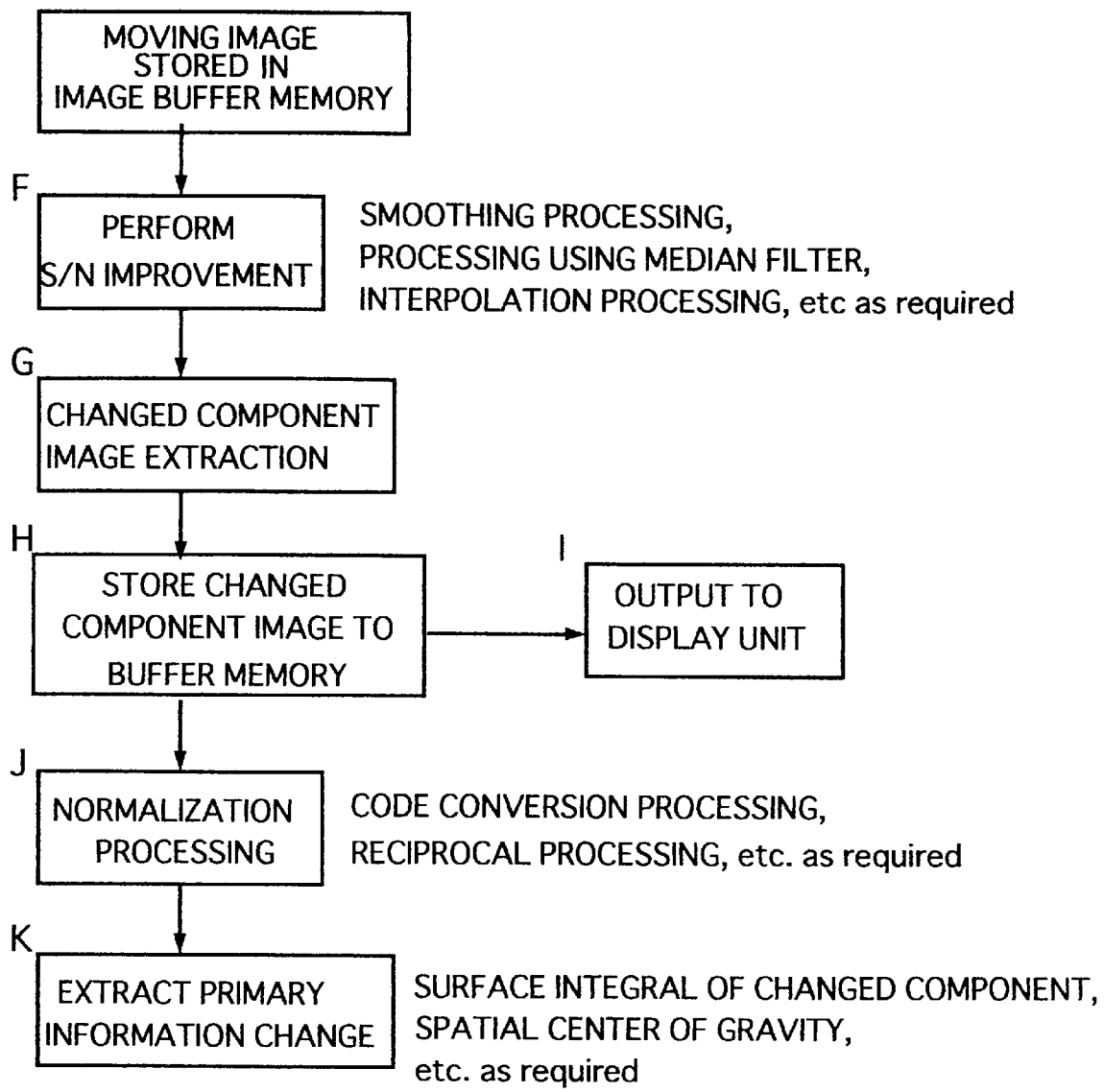
FIG. 4 is a flow chart showing the step of performing primary processing in the method according to the present invention.

Reference numerals 201 to 205 denote units constituting the primary processing means 20. Description is made of a series of operations of the units with reference to a flow chart of FIG. 4.

Reference numeral 201 denotes an S/N improving unit, which performs threshold processing, smoothing processing, interpolation processing, improvement in noises using a median filter for each pixel with respect to a moving picture stored in the image buffer memory 104 (step F).

Reference numeral 202 denotes a changed component image extracting unit, which extracts a changed component image from corresponding images in the same portion of a frame at a time point T0 which is updated and a frame at a time point T1 which is updated in a predetermined relationship with the time point T0 with respect to a moving picture inputted by the image input unit 10 by referring to a look-up table prepared depending on the objective of information extraction (subtraction, division, differentiation and integration, binary-coding or gamma correction) or directly executing an operation such as subtraction or division between images (step G).

The changed component image which is extracted by the changed component image extracting unit 202 is temporarily stored in the image buffer memory 203 (step H). The image stored in the image buffer memory 203 is continuously outputted to a CRT screen, for example, which is also used as means for visually reporting abnormal conditions of the object to a operator in a factory (step I).

The changed component image which is stored in the image buffer memory 203 is subjected to normalization processing (code conversion processing in a pixel having a negative value in the case of difference extraction, or reciprocal processing in a pixel having a value exceeding one in the case of a quotient) by a normalization processing unit 204 (step J), after which the primary information change such as the surface integral of the changed component and the spatial center of gravity is extracted by the primary information change extracting unit 205 (step K). The foregoing processing can be selected as required.

Figure 5:
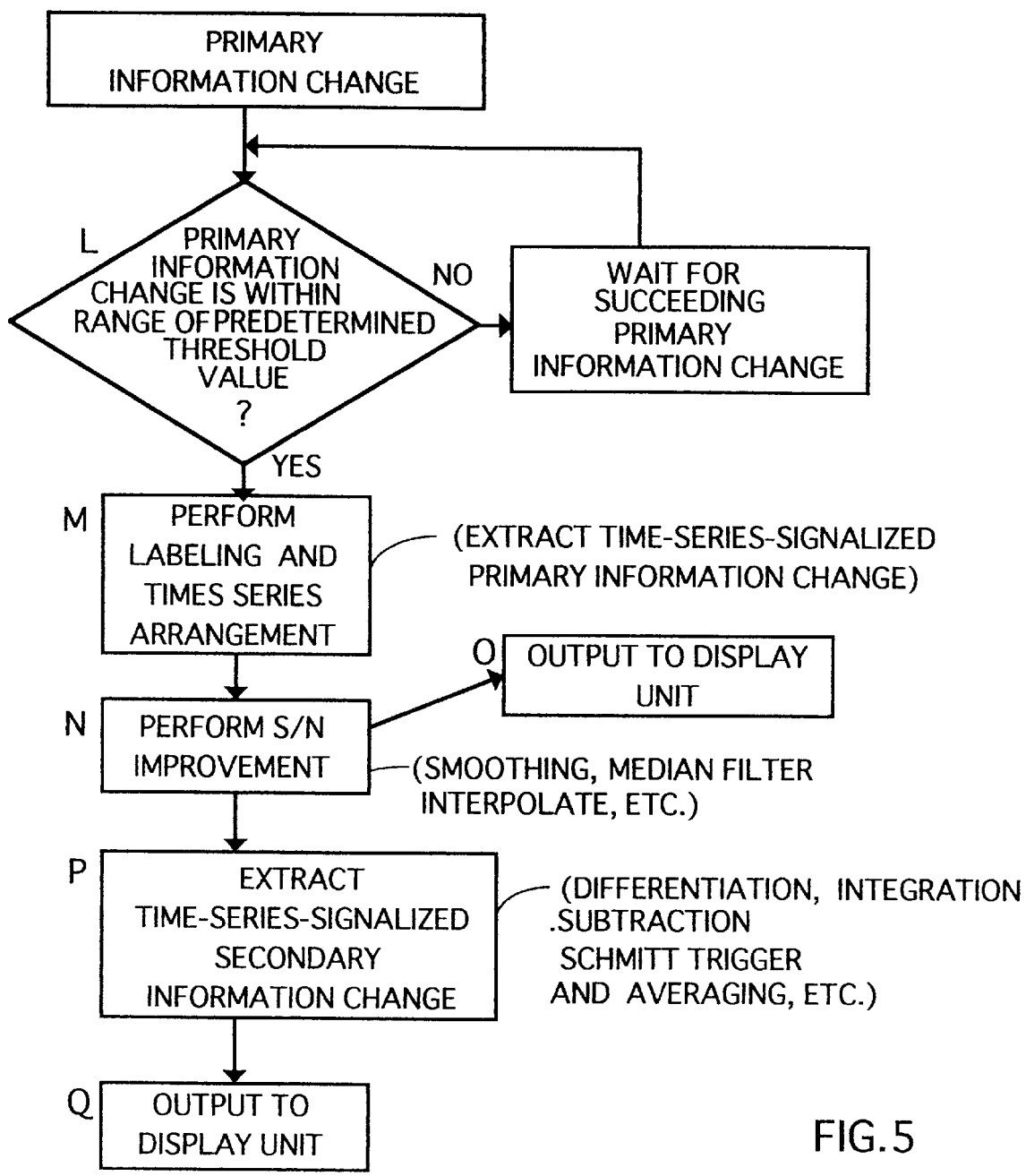
FIG. 5 is a flow chart showing the step of performing secondary processing in the method according to the present invention.

Reference numeral 30 denotes secondary processing means. Description is made of the construction and a series of operations of the secondary processing means 30 with reference to the block diagram of FIG. 2 and a flow chart of FIG. 5.

Reference numeral 301 denotes a comparator for comparing the primary information change obtained by the primary processing means 20 with a predetermined threshold value, which judges whether or not the primary information change is within the range of the predetermined threshold value (step L), and sends out data to a time series arrangement processing unit 302 if the primary information change is within the range.

In the time series arrangement processing unit 302, labeling of a time code and/or an identification code and predetermined time series arrangement of time series data are performed (step M). An information change arranged in time series is defined as a time-series-signalized primary information change. For example, the primary information change is an amount obtained by adding a changed component for each pixel which is an element of one changed component image. If the original moving picture inputted is a black and white shaded two-dimensional image, therefore, the primary information change becomes one scaler value, so that the dimension is decreased, which is favorable in performing the succeeding processing.

The time-series-signalized primary information change is subjected to threshold processing, smoothing processing, interpolation processing and improvement in noises using a median filter by an S/N improving unit 303 (step N).

The time-series-signalized primary information change after the improvement in noises, along with a changed component image, is outputted to the CRT screen, for example, as required (step O), which is also effectively utilized for identifying abnormal portions and the degree of abnormalities in an object to the measured.

The information is further subjected to differentiation and integration processing, subtraction processing, Schmidt trigger processing and averaging processing by a time-series-signalized secondary information change extracting unit 304, thereby to extract a time-series-signalized secondary information change having a physical meaning different from that of the primary information change (step P).

The time-series-signalized secondary information change is also displayed on the CRT screen, for example, similarly to the changed component image and the time-series-signalized primary information change after the improvement in noises (step Q), which is effectively utilized for the diagnosis of abnormalities in the object, the observation of the distribution of a state parameter paid attention to, the analysis of the frequency of occurrence, and the like. The foregoing processing can be selected as required.

Reference numeral 40 denotes higher-order processing means for extracting a characteristic parameter from the time-series-signalized secondary information change obtained by the secondary processing means 30 by time series signal processing or the like. As a method of extracting the characteristic parameter, at least one processing in a group consisting of time series signal processing, fast Fourier transformation, an auto-correlation function, a cross-correlation function, discrete cosine transformation, a zero crossing method, a maximum entropy method, frequency analysis, phase shift detection, differentiation and integration, a moment and a cepstrum is used. The primary processing means, the secondary processing means and the higher-order processing means may be collected into one or more means depending on an object being measured and its phenomenon, or may be conversely finely divided.

As preprocessing of extraction of a characteristic parameter, at least one of interpolating means, averaging means, smoothing means, under-threshold noise reducing means, bias adjusting means, discrete cosine transforming means, frequency analyzing means, and error signal correcting means is used as required.

Various types of characteristic parameters extracted by the higher-order processing means 40, for example, frequency characteristics, a frequency spectrum, the number of times of displacement exceeding a threshold value per unit time, an acceleration component and phase information are displayed on the CRT screen, for example, similarly to the changed component image, the time-series-signalized primary information change after the improvement in noises and the time-series-signalized secondary information change, and are effectively utilized for the diagnosis of abnormalities in the object and the improvement in the precision of the prediction of abnormalities. The foregoing processing can be selected as required.

Reference numeral 50 denotes output means for displaying the various types of information extracted in the means 20 to 40 on the CRT screen, for example, or outputting the information to another measuring instrument, an effector containing a computer, or the like. The function of each of units constituting the output means 50 will be described with reference to FIG. 2.

Reference numeral 501 denotes a display memory for displaying a changed component image, a time-series-signalized primary information change after reducing noises, a time-series-signalized secondary information change or a characteristic parameter.

Reference numeral 502 denotes a digital-to-analog (D/A) converter for converting image data stored in the display memory 501 into an analog video signal or converting a digital signal into an analog signal so as to output a simple intensity signal such as a voltage or a current outward.

The analog video signal from the D/A converter 502 is transmitted to a display unit 503, and is displayed on the display unit 503, for example, a television monitor as an image using a television display method, which is not required for a display device capable of digital input.

Furthermore, various types of signals converted into analog signals as required are transmitted to a simple intensity signal output unit 504, where data transmission to external equipments is made.

Reference numeral 505 denotes warning means using a buzzer, flashing of light, display of a frame, which can compare the time-series-signalized primary information change after the improvement in noises, the time-series-signalized secondary information change or the characteristic parameter with a predetermined threshold value, sound a warning buzzer located in an operator room, for example, and report abnormal conditions of the operation or abnormal conditions of the measuring instrument to an operator so as to urge the operator to suitably cope with the abnormal conditions if it exceeds the threshold value.

Reference numeral 506 denotes a control signal input-output unit for outputting and-inputting various types of signals to and from external control means 70.

Reference numeral 70 denotes external control means for controlling another measuring instrument, a computer or the like in response to an output signal from the output means 50 and transmitting a signal from another measuring instrument, a computer or the like to internal control means 60.

Reference numeral 60 denotes internal control means for controlling the operations of the various means 10 to 50 and 70, which is composed of a central processing unit (for example, i80486 manufactured by Intel Corp., a predetermined digital signal processor, a numerical processor, a memory or the like), for example.

Figure 6:
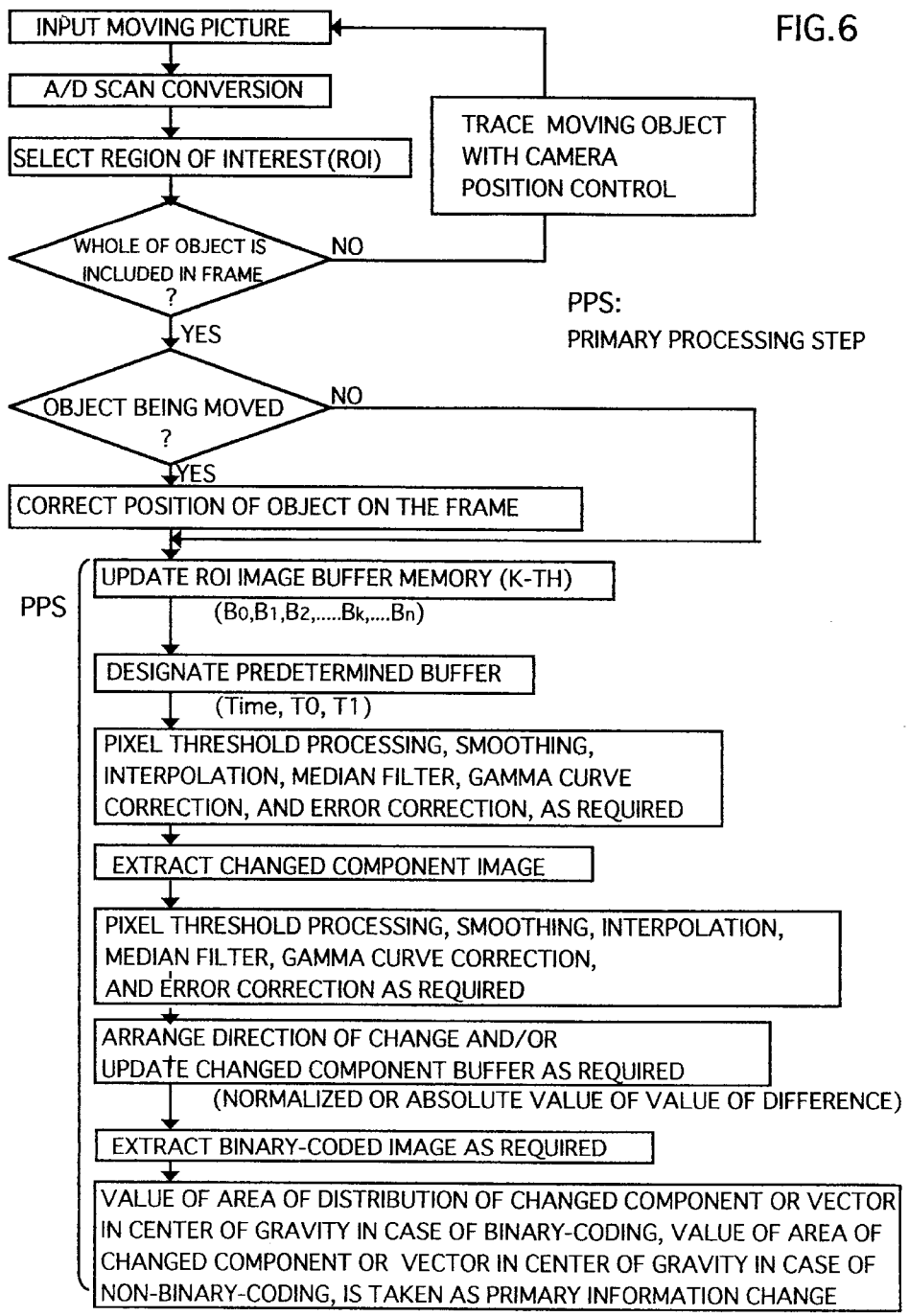
FIG. 6 is a flow chart showing in detail the inputting step to the step of performing primary processing in the method according to the present invention.

FIG. 6 is a flow chart showing in detail the step of inputting a moving picture and the step of performing primary processing in the embodiment of a method of extracting time series image information according to the present invention.

In FIG. 6, a discrete sample Bk of natural time series data indicates two-dimensional data of x X y in the step of updating an ROI image buffer memory. If the discrete sample Bk represents color data R, G and B, it is desirable that the data can be respectively set and processed independently. A one-dimensional scalar value is not obtained from two-dimensional data until a changed component is treated as the area in the final step in FIG. 6. Alternatively, if Bk represents color data R, B and G, a vector having three or less dimensions may be obtained. If the changed component is treated as a vector in the center of gravity, a two-dimensional vector may be obtained from two-dimensional data. Alternatively, if Bk represents color data R, B and G, a matrix of six elements may be obtained.

Figure 7:
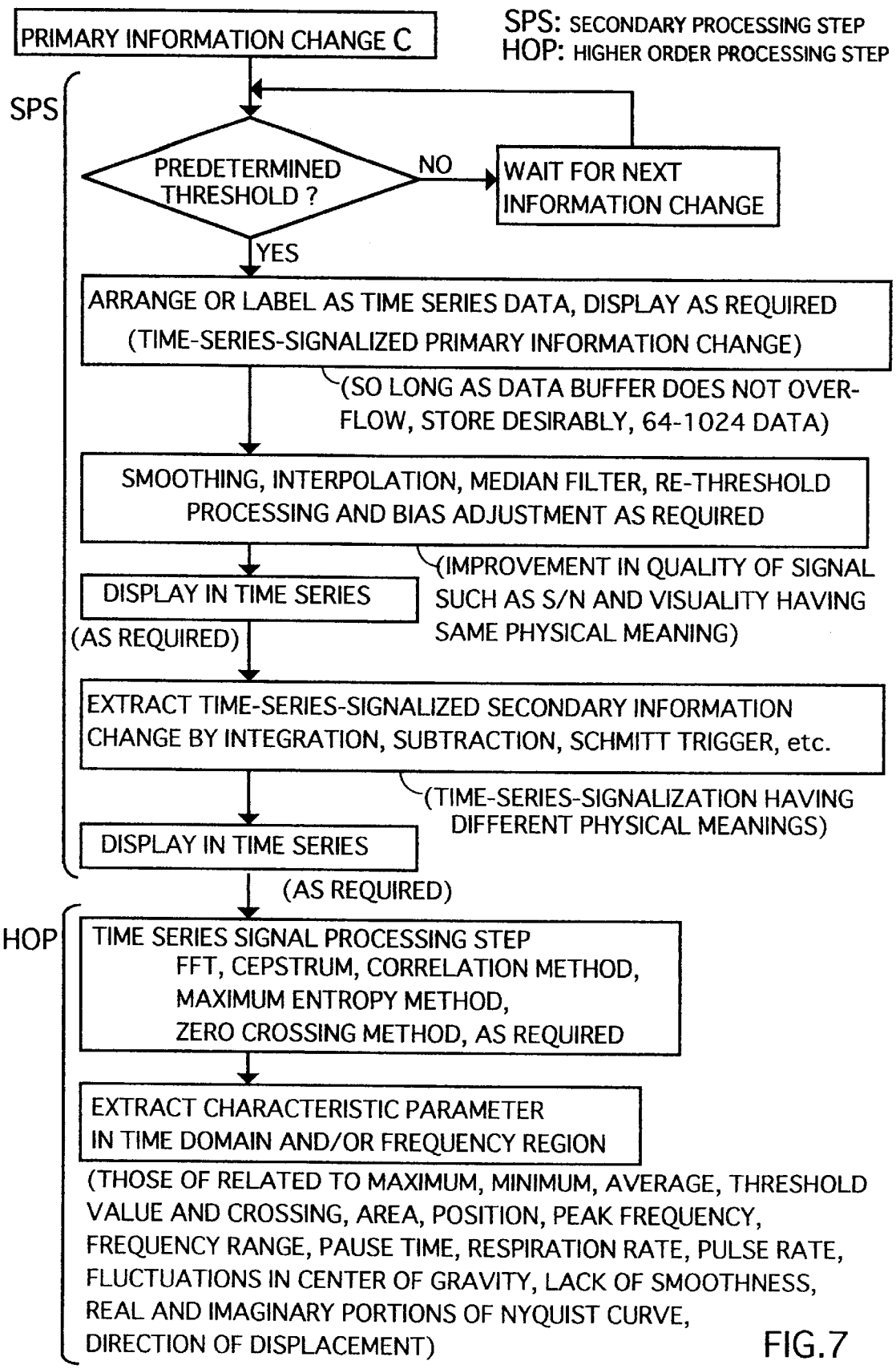
FIG. 7 is a flow chart showing in detail the step of performing secondary processing and the step of performing higher-order processing in the method according to the present invention.

FIG. 7 is a flow chart showing in detail the step of performing secondary processing and the step of performing higher-order processing in the embodiment of the method of extracting time series image information according to the present invention. In FIG. 7, it is desirable that an apparent abnormality can be removed as not time series data but single data in the step of judging whether or not the information change is in the range of a predetermined threshold value. Further, in the step of arranging the information change as time series data, for example, a time-series-signalized primary information change which is arbitrary time series data of an information change C is obtained. Furthermore, in the step of displaying time series data as required, a time-series-signalized secondary information change which differ in a physical meaning from the time-series-signalized primary information change is obtained by Schmidt trigger processing, integration processing or processing for obtaining an acceleration using the second subtraction, for example.

The step of performing higher-order processing in FIG. 7 is mainly an illustration of the step of extracting a characteristic parameter.

Figure 8:
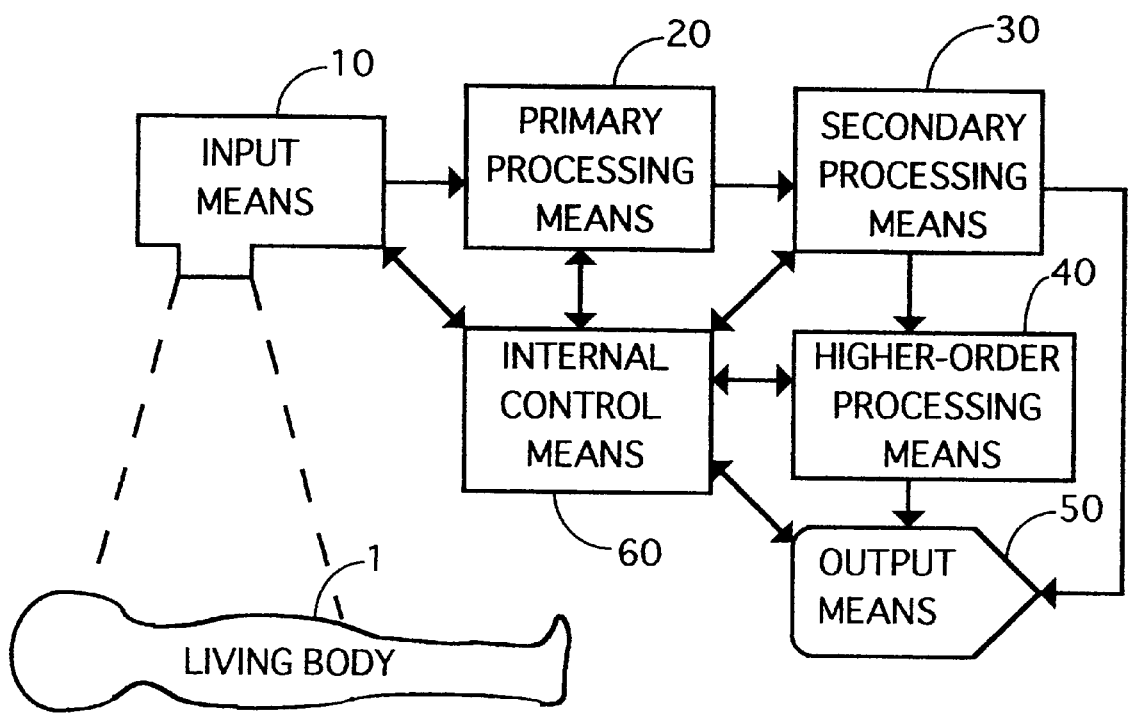
FIG. 8 is a block diagram showing the construction of a preferred embodiment of an apparatus for extracting time series image information from a living body according to the present invention.

FIG. 8 is a block diagram showing the construction of an apparatus for extracting time series image information from a living body according to the present invention. A living body 1 may be either a human body or a living animal. As shown in FIG. 1, the apparatus for extracting time series image information comprises input means 10, primary processing means 20, secondary processing means 30, higher-order processing means 40, output means 50, and internal control means 60.

Figure 9:
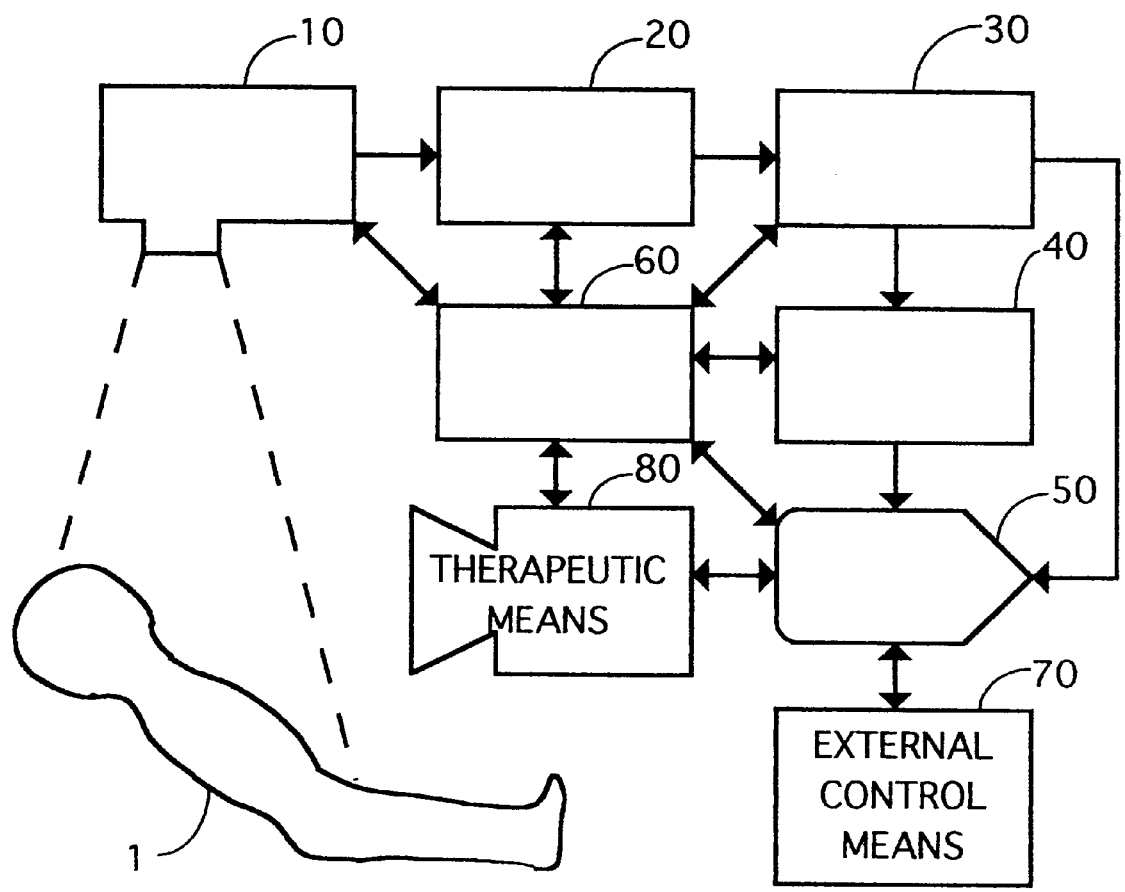
FIG. 9 is a block diagram showing the construction of a preferred embodiment of an apparatus for extracting time series image information from a living body and treating the living body according to the present invention.

FIG. 9 is a block diagram showing the construction of an apparatus for extracting time series image information from a living body and treating the living body according to the present invention. A living body 1 may be either a human body or a living animal. As shown in FIG. 1, the apparatus for extracting time series image information comprises input means 10, primary processing means 20, secondary processing means 30, higher-order processing means 40, output means 50, internal control means 60, external control means 70, and therapeutic means 80.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for extracting time series image information comprising:

input means for inputting a moving picture of an object;

primary processing means for detecting a primary information change in each of corresponding regions of a frame or field at a time point T0 which is updated and a frame at a time point T1 which is updated in a predetermined relationship with the time point T0 with respect to natural time series information on said moving picture inputted at a predetermined frame rate, said primary information change representing a changed component image as one scalar or only one vector;

secondary processing means for newly arranging said primary information change as an element to create a time-series-signalized primary information change which is arbitrary time series information and extracting a time-series-signalized secondary information change having a physical meaning different from that of the time-series-signalized primary information change as required; and higher-order processing means for extracting a higher-order characteristic parameter as required;

output means for outputting the time series image information, primary information change, natural time series information, time-series-signalized primary information change, arbitrary time series information, time-series-signalized secondary information change and the higher-order characteristic parameter; and internal control means for controlling the time series image information, primary information change, natural time series information, time-series-signalized primary information change, arbitrary time series information, time-series-signalized secondary information change and the higher-order characteristic parameter.

2. The apparatus according to claim 1, wherein said input means comprises means for selecting one or a plurality of arbitrary spatial and/or time regions of interest as required.

3. The apparatus according to claim 1, wherein said input means comprises means for tracing the object so that the whole thereof exists in a frame within its field of view.

4. The apparatus according to claim 1, wherein said input means comprises means for correcting the movement of the whole of the object in a frame when the change of a part of the object is detected.

5. The apparatus according to claim 1, wherein said primary processing means extracts a changed component image from corresponding images in the same portion of the frame at the time point T0 and the frame at the time point T1 which is updated in a predetermined relationship with the time point T0 by performing subtraction processing or division processing and/or referring to a look-up table prepared depending on the objective of information extraction, and extracts from the changed component image the primary information change including one of the surface integral of the changed component and the spatial center of gravity.

6. The apparatus according to claim 1, wherein said secondary processing means compares the primary information change obtained in the primary processing means with a predetermined threshold value to perform labeling and predetermined arrangement every time the primary information change exceeds the threshold value, employs the primary information change as data arranged in time series, performs threshold processing, smoothing processing, interpolation processing and improvement in a signal-to-noise (S/N) ratio of a signal using a median filter, followed by at least one of differentiation and integration processing, subtraction processing, division processing, Schmitt trigger processing and averaging processing as required, to extract a time-series-signalized secondary information change having a physical meaning different from that of the time-series-signalized primary information change.

7. The apparatus according to claim 1, wherein said internal control means is synchronized with at least one of warning means, event trigger and external control means by an input-output signal.

8. A method of extracting time series image information comprising the steps of:

inputting a moving picture of an object;

performing primary processing for detecting a primary information change in each of corresponding regions of a frame at a time point T0 which is updated and a frame at a time point T1 which is updated in a predetermined relationship with the time point T0 with respect to natural time series information on said moving picture inputted at a predetermined frame rate, said primary information change representing a changed component image as one scalar or only one vector;

performing secondary processing for newly arranging said primary information change as an element to create a time-series-signalized primary information change which is arbitrary time series information and extracting a time-series-signalized secondary information change having a physical meaning different from that of the time-series-signalizing primary information change as required;

performing higher-order processing for extracting a higher-order characteristic parameter as required; and outputting the time series image information, primary information change, natural time series information, time-series-signalized primary information change, arbitrary time series information, time-series-signalized secondary information change and the higher-order characteristic parameter.

9. The method according to claim 8, wherein said step of performing secondary processing comprises the steps of comparing the primary information change obtained in the step of performing primary processing with a predetermined threshold value to perform labeling and predetermined arrangement every time the primary information change exceeds the threshold value, employing the primary information change as data arranged in time series, performing threshold processing, smoothing processing, interpolation processing and improvement in a signal-to-noise (S/N) ratio of a signal using a median filter, followed by at least one of differentiation and integration processing, subtraction processing, division processing, Schmitt trigger processing and averaging processing as required, to extract a time-series-signalized secondary information change having a physical meaning different from that of the primary information change.

10. An apparatus for extracting time series image information from a living body and treating the living body comprising:

input means for inputting a moving picture of a living body;

primary processing means for detecting a primary information change in each of corresponding regions of a frame or field at a time point T0 which is updated and a frame at a time point T1 which is updated in a predetermined relationship with the time point T0 with respect to natural time series information on said moving picture inputted at a predetermined frame rate, said primary information change representing a changed component imae as one scalar or only one vector;

secondary processing means for newly arranging said primary information change as an element to create a time-series-signalized primary information change which is arbitrary time series information and extracting a time-series-signalized secondary information change having a physical meaning different from that of the time-series-signalized primary information change as required; and higher-order processing means for extracting a higher-order characteristic parameter as required;

output means for outputting the time series image information, primary information change, natural time series information, time-series-signalized primary information change, arbitrary time series information, time-series-signalized secondary information change and the higher-order characteristic parameter;

external control means for controlling the apparatus with wired or wireless control network as required; and internal control means for controlling the time series image information, primary information change, natural time series information, time-series-signalized primary information change, arbitrary time series information, time-series-signalizing secondary information change and the higher-order characteristic parameter.

* * * * *

UNITED STATES PATENT AND TRADEMARK OFFICE
CERTIFICATE OF CORRECTION

PATENT NO. : 5,953,439
DATED : Sep. 14, 1999
INVENTOR(S) : Ishihara et al.

It is certified that error appears in the above-identified patent and that said Letters Patent is hereby corrected as shown below: On the title page: Item [54] and Column 1, line 3, the correct title should read: ANALYZING AN OBJECT

CHANGE FROM A MOVING PICTURE USING TIME SERIES INFORMATION OF

CHANGES BETWEEN IMAGES AND BY EXTRACTION OF SUCH INFORMATION

Signed and Sealed this

Twenty-eighth Day of March, 2000

*Attest:*

Q. TODD DICKINSON

*Attesting Officer*       *Commissioner of Patents and Trademarks*